United States Patent [19]

Aronovici

[11] 4,358,330
[45] Nov. 9, 1982

[54] METHOD OF MANUFACTURE OF LAYERED FILM INCLUDING LAYERS HAVING CROSSED DIRECTIONS OF MOLECULAR ORIENTATION

[76] Inventor: Adolfo S. Aronovici, Moreno 1942 - Ramos Mejia - PCIA, Beunos Aires, Argentina

[21] Appl. No.: 183,763

[22] Filed: Sep. 3, 1980

Related U.S. Application Data

[63] Continuation-in-part of Ser. No. 13,020, Feb. 21, 1979, abandoned.

[30] Foreign Application Priority Data

Oct. 17, 1978 [AR] Argentina .................. 274112

[51] Int. Cl.³ ............................. B29D 7/24
[52] U.S. Cl. ........................... 156/244.14; 264/503; 264/514; 264/564; 264/173; 425/326.1; 428/910
[58] Field of Search ............... 264/503, 514, 563–569, 264/209.2, 173; 425/326.1, 72 R; 156/244.14; 428/910

[56] References Cited

U.S. PATENT DOCUMENTS

| | | | |
|---|---|---|---|
| 3,342,657 | 9/1967 | Dyer | 156/244.14 |
| 3,368,007 | 2/1968 | Palmer | 264/564 |
| 3,474,160 | 10/1969 | Doering | 264/503 |
| 3,635,634 | 1/1972 | Nagano | 425/325 |
| 3,650,649 | 3/1972 | Schippers | 264/503 |
| 3,853,661 | 12/1974 | Sudo | 264/503 |
| 3,891,374 | 6/1975 | Ninomiya et al. | 264/566 |
| 3,949,042 | 4/1976 | Utz | 264/564 |
| 3,966,861 | 6/1976 | Papesh et al. | 264/503 |
| 4,009,975 | 3/1977 | Ninomiya et al. | 264/569 |
| 4,011,128 | 3/1977 | Suzuki | 264/569 |

*Primary Examiner*—Jeffery R. Thurlow
*Attorney, Agent, or Firm*—Steinberg & Raskin

[57] ABSTRACT

A layered film of thermoplastic material and method of manufacturing the same are disclosed. The film is defined by a plurality of superposed layers, the material forming a pair of adjacent layers having molecular chains oriented in certain directions which respectively cross each other at an angle in a range of between 5° and 90°. The film is manufactured by heating solid thermoplastic material to its softening point, conveying the viscous molten mass so formed while mechanically working the same to an annular material shaping opening of a rotary die or matrix from which the material is discharged in the form of a tubular segment which is directed into the nip defined by a pair of rotating stretching cylinders which flatten the tubular segment to form the layered film and which are rotated at a speed which tends to orient the molecular chains in an axial or machine direction. Gas is injected into the space defined within the tubular segment which tends to orient the molecular chains in a circumferential or transverse direction. According to the invenion, the die is rotated at a certain speed which, in combination with the take off speed of the rotating cylinders and the blow ratio acts to relocate the frost line of the tubular segment so that the desired molecular orientation is imparted to the film layers prior to the solidification of the viscous molten material.

2 Claims, 3 Drawing Figures

METHOD OF MANUFACTURE OF LAYERED FILM INCLUDING LAYERS HAVING CROSSED DIRECTIONS OF MOLECULAR ORIENTATION

This application is a continuation-in-part of U.S. application Ser. No. 13,020 filed Feb. 21, 1979, now abandoned.

BACKGROUND OF THE INVENTION

This invention relates generally to layered films formed of thermoplastic material and methods for their manufacture and, more particularly, to layered films and their method of manufacture, wherein the film is defined by a plurality of superposed layers and wherein the molecular chains of the material forming pairs of adjacent layers are oriented in certain directions which respectively cross each other.

Layered films formed of thermoplastic material are known and are generally manufactured by the so-called "blown-film" extrusion process. More particularly, according to such known processes, raw material in the form of a particular thermoplastic material suitable for the purpose intended in solid form, such for example as pellets, powder or amorphous particles, is mechanically transformed by mechanical working, such as through the action of a rotary screw associated with an extrusion machine, and through the application of heat provided, for example, by electric resistance heating, into a viscous mass at least at the softening point of the raw material. The viscous mass is conveyed to an annular die cavity or material forming opening of an extrusion die or matrix which forms the material into a two layered tubular segment defining an interior space together with the rotary matrix and a pair of stretching and rolling cylinders upstream thereof to which the tubular segment is directed, into which interior space a predetermined amount of gas is injected or "blown" to give the tubular segment a desired width. Examples of such techniques are disclosed in U.S. Pat. Nos. 3,635,634; 4,009,975; 4,011,128; and 3,891,374.

In such known technique, the stretching cylinders are rotated at a rate or velocity which is compatible with and determined by the rate at which the tubular segment discharges from the die opening so as to continue to feed the material at the same rate as that at which it is discharged from the matrix. In this manner, the tubular segment is shaped so as to have the desired thickness. The thus flattened tubular segment thereupon passes between a set of rolling cylinders and is thereafter subjected to further treatments and procedures so as to impart to the finished product any particular characteristics required for its use.

Further, in such known methods, the die may be rotated for the purpose of avoiding irregularities in the thickness of the formed film and to thereby avoid the formation of crests and valleys on any roll of the layered film which may be formed. Such crests and valleys would form, for instance, where film extruded from a non-rotating die having zones of greater and lesser thickness, was wound so that such zones coincide in overlapping turns. In order to achieve the avoidance of such thickness irregularities in the known processes being described, the matrix is conventionally rotated at a rate in the range of between 1/10 and ½ rpm.

In the "blown film" extrusion technique described above, the film formed by the matrix is desirably stretched by stretching cylinders in a balanced manner to obtain a favorable balance of strength for the film in the longitudinal and transverse directions. Such a stretching of the formed film results in a unidirectional orientation of the molecular chains of the thermoplastic material which depends on various factors including the particular material being formed, the particular working conditions and, to a greater extent, on whether the material is of the long or short chain type.

In this connection, the opening between the cylinders is normally variable, the extent of the opening being limited at its upper end to avoid wrinkling of the film which is a particular danger in the case of rigid thermoplastic material, such as high density polyethylene, polypropylene, etc. and at its lower end by the possibility of presenting an obstruction to the passage of the film where the opening is too narrow for the pressures and temperatures involved in the particular process.

Prior art techniques of the type described above are generally characterized by the provision of equipment for cooling and solidifying the molten material upon the latter discharging from the die opening. The tubular segment is then directed over one or more rotating and fixed mandrels whereupon additional apparatus reheats the previously solidified tubular segment, the mandrels then imparting an angular orientation to the molecular chains in the reheated regions thereof. This procedure has been utilized for the reason that it has conventionally been the understanding that oriented molecular chains in thermoplastic material could not be effectively obtained when the material is in a molten state. Thus, these conventional techniques require the provision of equipment for cooling the molten material and for reheating the same, as well as rotating and fixed mandrels, which of course renders the apparatus relatively complicated and expensive in manufacture. Further, the width of the film produced by such conventional techniques was necessarily determined by the dimensions of the mandrels and the die being utilized.

The presently known fabrication technique described above has not proved to be entirely satisfactory for other reasons. Thus, in view of the increase in need for automatic and semi-automatic packing processes which require large quantities of materials, the development of a film having a high heat-sealing capacity has become essential. Such a film cannot be obtained using the fabrication technique described above. Further, the films provided by known techniques do not have optimum toughness or tensile, elongation and rupture strength.

SUMMARY OF THE INVENTION

Accordingly, one object of the present invention is to overcome the disadvantages in the prior art methods and apparatus described above.

Another object of the present invention is to provide a new and improved method of maufacturing a layered film which combines the characteristic advantages of thermoplastic material, such as high strength, minimum permeability to greases, oils, gases, etc., good working and welding properties and low costs.

Still another object of the present invention is to provide a new and improved method of manufacturing a film having superposed layers with oriented molecular chains which eliminates the requirements of additional cooling and heating apparatus as well as mandrels and the like.

Yet another object of the present invention is to provide a new and improved method of manufacturing layered films which have a width which is not limited by the size of any mandrels or the die being utilized.

Still yet another object of the present invention is to provide a new and improved layered film having a high heat-sealing capacity, which is tougher, and which has improved tensile, elongation and rupture strength relative to currently available films.

Briefly, in accordance with the present invention, these and other objects are attained by modifying the conventional "blown film" technique described above so that the molecular chains of the material forming the layers of the film are oriented substantially immediately prior to the thermoplastic material solidifying after discharge from the die opening, i.e., during its transition from the molten to the solidified condition which occurs in the "frost line band".

This is accomplished by relocating the frost line band of the tubular segment to a region substantially immediately above the annular die opening through the rotation of the die or matrix at a speed in the range of between 1 to 20 rpm and by selectively correspondingly adjusting the take-off speed determined by the stretching cylinders and the "blow ratio", i.e., the ratio of the diameter of the tubular segment to the diameter of the annular die opening, whereby a definite directional orientation of the molecular chains of the layers of the tubular segment is obtained.

According to the invention, the angle at which the direction of the molecular chain and a pair of adjacent superposed layers cross is in the range of between 5° and 90°.

Thus, the rotation of the matrix in the method of the present invention, rather than merely compensating for differentials in thickness over the film, has the dual purpose of such compensation and, in addition, to relocate the frost line band of the tubular segment so that a particular directional orientation can be imparted to the molecular chains of the film forming material prior to its initial solidification. To accomplish this dual purpose, the rotational speed of the matrix is necessarily greater than in conventional techniques.

The opening between the stretching cylinders is variable according to the invention so that a high pressure gripping or strong obstruction is presented in any particular case which results in a film wherein the molecular chains of the layers are crossed. In this manner, a greater toughness as well as improved tensile, elongation and rupture strength is obtained.

DESCRIPTION OF THE DRAWINGS

A more complete appreciation of the invention and many of the attendant advantages thereof will be readily appreciated as the same becomes better understood by reference to the following detailed description when considered in connection with the accompanying drawings in which.

DESCRIPTION OF PREFERRED EMBODIMENTS

Figure 1:
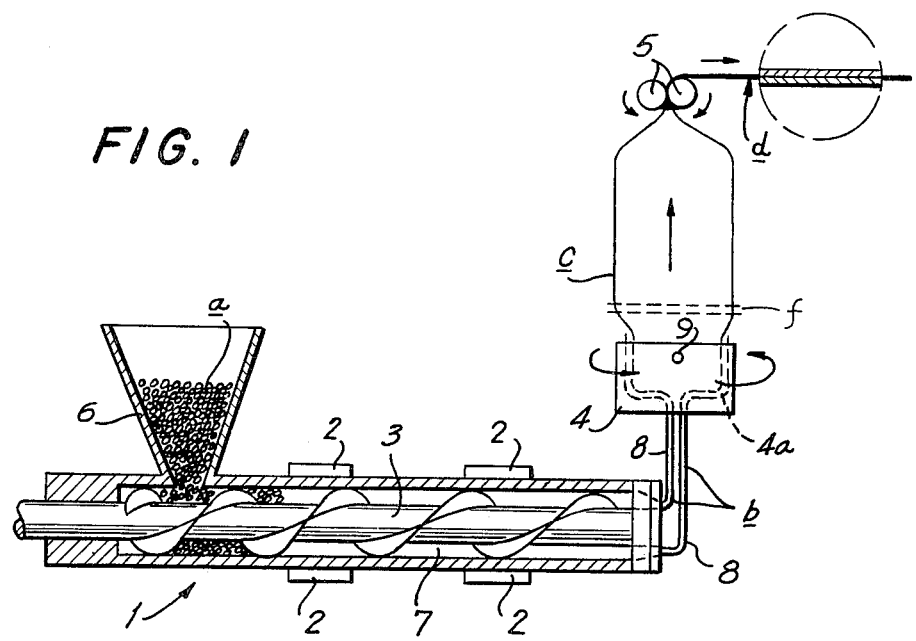
FIG. 1 is a side schematic view in partial section of an extrusion apparatus for practicing the method of the present invention.

Referring now to the drawings wherein like reference characters designate identical or corresponding parts throughout the several views and more particularly to FIG. 1, extrusion apparatus, generally designated 1 are illustrated. The apparatus 1 include a feed hopper 6 having a lower discharge end which communicates with an elongate chamber 7 in which a rotary screw 3 is disposed. A source of heating such as electrical resistance heaters 2 surround chamber 7.

A die or matrix 4 is rotatably mounted around a central axis at the discharge or downstream end of chamber 7. The matrix 4 is formed with an annular die cavity or material shaping opening 4a, concentric with the axis of rotation of matrix 4.

Conduits 8 fluidly interconnect the discharge end of chamber 7 with the annular cavity 4a of matrix 4. At least one set of stretching and rolling cylinders 5 are located above matrix 4.

In operation, a predetermined amount of solid thermoplastic material a, such for example in the form of pellets, powder or amorphous particles, having a composition determined by the desired properties of the final product is deposited into hopper 6. The raw material is fed, such as by gravity, from hopper 6 into the upstream end of chamber 7 whereupon the same is conveyed in the downstream direction through the rotation of screw 3. The solid thermoplastic material is transformed to a viscous mass b as it reaches its softening point through the application of heat from heaters 2. The viscous mass b is conveyed by mechanical action of screw 3 from conduits 8 to the cavity 4a of rotary matrix 4 from which the material discharges, still in an unsolidified condition, in the form of a tubular segment c which is directed into the nip defined by the pair of stretching and rolling cylinders 5.

A predetermined amount of gas, such as air, is injected, such as through a bore 9, into the space within tubular segment c between matrix 4 and the set of stretching and rolling cylinders 5. In this manner, the tubular segment c is given a desired width.

As noted above, the tubular segment c is directed between the cylinders 5 and is drawn and rolled into a film d. Thus, the opposed wall sections of tubular segment c are flattened together under the action of rollers 5 to form the layered film d. The film d is then wound on a take-up roll (not shown) as is conventional.

The thickness of the wall defining the tubular segment c is determined by coordinating the rotational speed of cylinders 5 and the rate at which the material defining the tubular segment c is discharged from the cavity 4a of matrix 4.

According to the present invention, the molecular chains of the material forming layers of the film are oriented after the same discharges from the annular die opening, but prior to the solidification thereof. This has not been possible in prior art techniques for the reason that the frost line band, i.e., the transition region wherein the material undergoes the transition from the molten to the solid stage, would otherwise be located a substantial distance from the die opening absent the provision of a positive cooling action in a region substantially proximate to the die. This of course could not be tolerated since the tubular segment would lack the requisite structural integrity over its axial extent to be subjected to the "blown film" operation.

However, the method of the present invention results in a "relocation" of the frost line band to a region sufficiently proximate to the die opening to enable the molecular orientation to be effected in the frost line band without the necessity of preliminarily cooling and solidifying the material. More particularly, according to the method of the present invention, the die or matrix 4 is rotated at a significantly greater rate than is the case in conventional techniques wherein such dies were rotated at a rate of between 1/10 and ½ rpm for the purpose of avoiding irregularities in film thickness. Thus, according to the present invention, the die is rotated at a rate of between 1 and 20 rpm. By adjusting the take off speed of the stretching cylinders and the blow ratio, i.e., the ratio of the diameter of the tubular segment to the diameter of the annular die opening in combination with the rotational rate of the die 4, the frost line band is relocated to a region designated "f" in FIG. 1. Thus, the region in which the material of the tubular segment undergoes a transition from the molten stage to the solid stage is located proximate to the die 4. This fact permits the molecular orientation to be effected in this region without any prior cooling of the material and also advantageously enables the elimination of rotating mandrels or the like which of course were necessary in prior techniques.

The take off speed effected by the cylinder 5 is generally in the range of between 1 and 300 feet per minute and adjustment of this rate results in a tendency of the molecular claims to align in a substantially axial direction, i.e., in the direction in which the tubular segment is stretched. Gas is injected into the tubular segment so that the blow ratio is between 1 and 3. This tends to orient the molecular chains in a circumferential or transverse direction. The rotation of the die 4 at a rate of between 1 and 20 rpm not only aids in the relocation of the frost line bands but, additionally, also contributes to orienting the molecular chains at an angle to the transverse and axial directions.

As mentioned above, by virtue of the rotation of matrix 4 at a rate of between 1 and 20 rpm, a partial orientation of the molecular chains of the material forming the layers of the film eventually formed by the wall of tubular segment c is obtained. The direction of the orientation of the molecular chains is thus a function of the direction of stretch of the tubular segment c and the rotation of matrix 4 with respect to the fixed point represented by cylinders 5 and the blow ratio.

The film d manufactured in accordance with the method of the present invention, comprises at least two superposed layers of thermoplastic material, the respective directions of the orientation of the molecular chains, diagrammatically illustrated as 6 and 7 slantingly crossing each other, the angle at which the directions of orientation cross, designated α being in the range of between 5° and 90°. The particular value for the crossing angle α is determined by and corresponds to the particular angular velocity of the rotary die or matrix, the stretching rate and the blow ratio. Rotation of the matrix at a speed in the lower end of the above-recited range results in the angle α being small (but above 5°) while rotation of the matrix at the upper end of the velocity range results in a larger angle α being formed. Further, the particular angle defined by the crossing directions of the oriented molecular chains depends upon the rate of discharge of the tubular segment from the matrix 4, the rotational speed and direction of the matrix 4, as described above, and the direction in which the tubular segment c is stretched which of course depends upon the stretching direction defined by cylinders 5.

Figure 2:
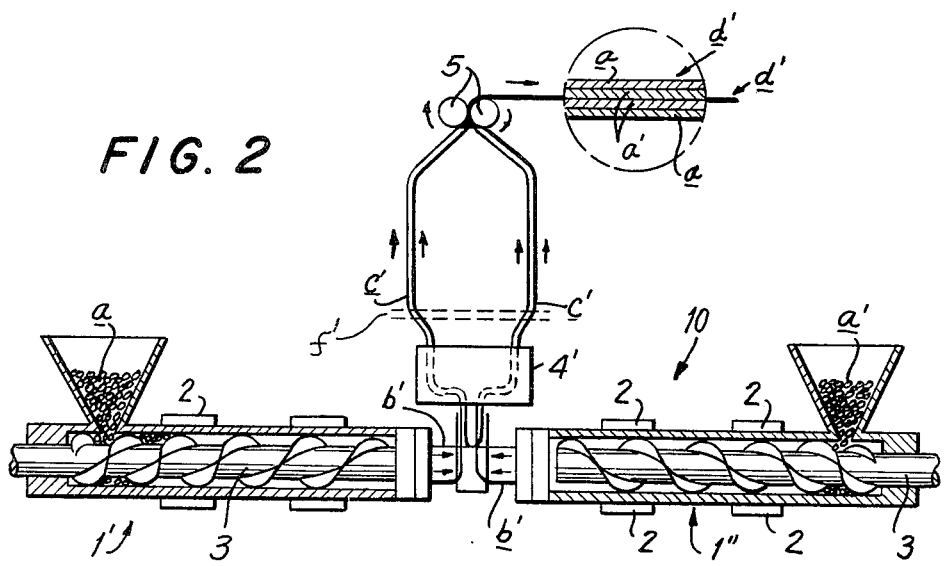
FIG. 2 is a side schematic view in partial section of another embodiment of apparatus for practicing the present invention.
Figure 3:
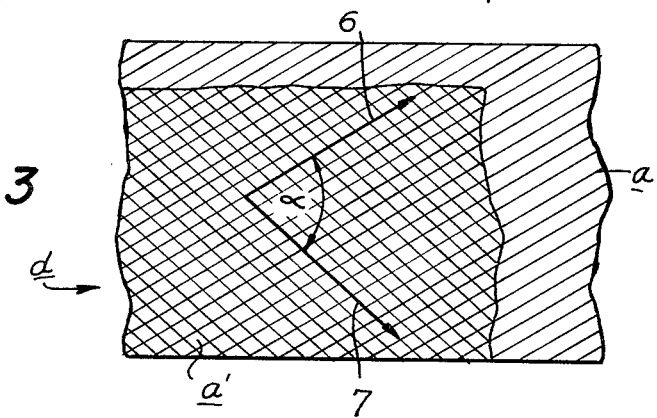
FIG. 3 is a plan view partially broken away of a layered film according to the present invention constructed according to the process of the present invention.

Referring now to FIG. 2, another embodiment of an extrusion apparatus for practicing the method of the present invention is illustrated for manufacturing a layered film having four superposed layers. Thus, the extrusion apparatus, designated 10, includes two extrusion machines 1',1", which may be identical to that described in connection with FIG. 1 or which may be different therefrom but, in any event, which operates simultaneously to direct a viscous mass b' to a common rotary matrix 4' having closely spaced, concentric die cavities. In this manner, a tubular segment c' is formed having two layers, each layer formed by the particular viscous mass coming from a respective extrusion machine. Thus, a double wall tubular segment c' is formed and stretched by cylinders 5, the tubular segment being flattened as it passes through cylinders 5 resulting in a layered film d' having four layers as shown in the detailed view illustrated in FIG. 2. This layered film d', as mentioned above, is defined by four superposed layers, pairs of adjacent layers having molecular chains which are oriented in directions which cross in a slanting manner in the manner described above in connection with FIG. 3.

The apparatus of FIG. 2 operates according to the same method as described above in connection with FIG. 1. Thus, the die 4' is rotated at a rate in the range of 1 to 20 rpm so that the frost line band in which molecular orientation occurs is located at a region f' proximate to die 4'.

Thus, a method has been described for forming a layered film, wherein pairs of adjacent layers are formed of material having molecular chains which are oriented in directions which slantingly cross each other at an angle of between 5° and 90°. This is achieved by a method which eliminates the necessity for cooling and solidifying the material after discharge from the die and a subsequent heating prior to the molecular orientation. Additionally, the provision of rotating and fixed mandrel structure is no longer required. The blow ratios obtained by the method of the present invention can be significantly increased relative to conventional techniques thereby making it possible to obtain desired widths for the resulting film. This is achieved by the rotation of the rotary matrix or die at a rate of between 1 and 20 rpm and through the selective adjustment of the stretching rate defined by the stretching cylinders, the direction in which the material is discharged from the rotary matrix and the direction of rotation of the matrix.

Obviously, numerous modifications and variations of the present invention are possible in the light of the above teachings. It is therefore to be understood that within the scope of the appended claims the invention may be practiced otherwise than as specifically described herein.

What is claimed is:
1. In a method for manufacturing a layered film from thermoplastic material in solid form, such as pellets, powder or amphorous particles, wherein said film is defined by a plurality of superposed layers, the material comprising each layer having molecular chains oriented in a certain direction, the orientation directions of pairs of adjacent layers crossing each other, comprising the steps of heating the solid thermoplastic material to its softening point to obtain a viscous mass of the thermo- plastic material; conveying the viscous mass while mechanically working the same through at least one flow stream into the annular material shaping die opening of a rotating matrix from which it discharges in the form of a tubular segment whereupon the viscous mass solidifies, and passing the tubular segment as it discharges from the matrix between at least one pair of rotating stretching cylinders to form the layered film; simultaneously injecting gas into the space defined within the tubular segment and between the matrix and stretching cylinders whereby the tubular segment obtains a desired width; adjusting the rotational speed of the cylinders and the rate of discharge of the viscous mass defining the tubular segment from the opening of the matrix with respect to each other whereby the tubular segment obtains the desired thickness; the improvement comprising:

relocating the frost line band wherein the transition of the material from its molten to a solidified state occurs to a region substantially immediately above the annular die opening through the steps of rotating the matrix at a rate in the range of between about 1 and 20 rpm, and selectively adjusting the stretching speed defined by the stretching cylinders, and the amount of gas injected into the tubular segment, and wherein said relocation of the frost line band is accomplished with the tubular segment not being cooled by separate cooling equipment during the method, whereby the molecular chains are oriented substantially immediately after the thermoplastic material is discharged from the die opening in a molten state and substantially immediately prior to the material solidifying.

2. Method according to claim 1, wherein the stretching speed defined by the stretching cylinders is in the range of between about 1 and 300 feet per minute and the amount of gas injected into the tubular segment is such as to obtain a blow ratio of between about 1 and 3.

* * * * *